United States Patent [19]

Muto et al.

[11] 4,381,483
[45] Apr. 26, 1983

[54] CHANGE SYSTEM FOR VEHICLE BATTERY WITH RELAY ACTUATED CHARGE INDICATOR

[75] Inventors: Katsuya Muto, Kariya; Takeshi Nakamoto, Obu; Isamu Nagase; Shigeru Sawada, both of Kariya, all of Japan

[73] Assignee: Nippondenso Co., Ltd., Kariya, Japan

[21] Appl. No.: 243,515

[22] Filed: Mar. 13, 1981

[30] Foreign Application Priority Data

Mar. 21, 1980 [JP] Japan ................... 55-36612

[51] Int. Cl.³ .............................................. H02J 7/14
[52] U.S. Cl. ........................................ 322/99; 320/48; 320/64
[58] Field of Search ................. 320/48, 64, 67; 322/99

[56] References Cited

U.S. PATENT DOCUMENTS 4,240,023 12/1980 Masutani ................... 322/99
4,295,087 10/1981 Morishita et al. ................. 320/48
4,303,878 12/1981 Masutani ................... 322/99

FOREIGN PATENT DOCUMENTS 270637 11/1964 Australia ................. 320/48
1209103 10/1970 United Kingdom ................. 320/48

Primary Examiner—William H. Beha, Jr.
Attorney, Agent, or Firm—Cushman, Darby & Cushman

[57] ABSTRACT

A charging system for a vehicle battery comprises a voltage detecting circuit having at least one element, such as a Zener diode, having an impedance variable in accordance with a voltage from an auxiliary rectifier connected to the armature coils of the alternator of the system. When the generating voltage is low at the initial operating period, the impedance of the voltage detecting circuit is kept high, and thus the generated current from the auxiliary rectifier is all supplied to the field coil of the alternator without being consumed by a driving circuit of a charge-indicating lamp. As the voltage from the auxiliary rectifier exceeds a predetermined voltage, the impedance of the detecting circuit lowers to cause the driving circuit to energize the lamp. The voltage detecting circuit may be constructed of one or more than one Zener diode, or of a plurality of diodes connected in the forward direction. The driving circuit may be a relay or a semiconductor switch, and is driven by a current from either the auxiliary rectifier or the battery.

15 Claims, 9 Drawing Figures

CHANGE SYSTEM FOR VEHICLE BATTERY WITH RELAY ACTUATED CHARGE INDICATOR

FIELD OF THE INVENTION

This invention generally relates to a charging system for a battery of a vehicle, such as an automobile, and more particularly, the present invention relates to an improvement in a circuit arrangement for indicating that the voltage generated is above a predetermined value which is sufficient for charging the battery.

BACKGROUND OF THE INVENTION

In a conventional charging system for a vehicle battery, a lamp is provided to indicate that the generated voltage is above a given value so that the battery is properly charged. In order to energize the lamp, a relay responsive to the voltage from an auxiliary rectifier is employed, where the output voltage of the auxiliary rectifier is used to energize the field coil of the alternator. The field coil is also supplied with a current from the battery via a field resistor so that initial energization of the field coil is effected by the current from the battery. The relay has a normally closed contacts, and thus the lamp is energized when the generated voltage represented by the output voltage of the auxiliary rectifier is below a predetermined voltage. When the generated voltage exceeds the predetermined voltage, the relay is energized to deenergize the lamp, indicating that the alternator is generating a sufficient voltage for charging the battery.

However, the conventional charging system suffers from the following disadvantages or drawbacks. Namely, at the beginning of power generation, a very low voltage is generated and a current is supplied to the winding of the relay. As a result, the field coil of the alternator cannot receive a sufficient amount of current from the auxiliary rectifier, deteriorating the rising characteristic of the alternator. Although it is possible to make the resistance of the above-mentioned field resistor supplying an initial exciting current from the battery to the field coil large to improve the rising characteristic, the rated power of the resistor has to be increased because of the increase of the current passing therethrough. Accordingly, a bulky resistor has to be built in an assembly of the alternator.

The conventional relay used for controlling the energization of the charge-indicating lamp is energized when the voltage applied thereto exceeds a first given voltage, i.e. a minimum operating voltage, and is deenergized when the voltage lowers below a second given voltage, i.e. a return voltage, which is lower than the first given voltage. Because of the difference between the minimum operating voltage and the return voltage, if the voltage from the auxiliary rectifier is below the minimum operating voltage but is above the return voltage during energization of the relay, the relay is continuously being energized to cause the charge-indicating lamp to indicate that the generated voltage is above a predetermined voltage which is sufficient for charging the battery until the voltage from the auxiliary rectifier lowers below the return voltage. This means that the charge-indicating lamp does not correctly represent the charging and noncharging states of the system. Therefore, it is desired that the return voltage is as close to the minimum operating voltage as possible. In order to reduce the difference between the minimum operating voltage and return voltage the number of relay windings has to be increased, and this will result in the increase in size of the relay.

Moreover, the above-mentioned minimum operating voltage of the relay is not necessarily uniform throughout a number of relays having the same rated voltage. In other words, there are variations in minimum operating voltage throughout a number of relays, and therefore, some relays having desired minimum voltage have to be selected so that the relay will satisfactorily operate in accordance with the voltage applied thereto.

SUMMARY OF THE INVENTION

The present invention has been developed in order to remove the above-mentioned disadvantages and drawbacks inherent to the conventional charging system of a vehicle battery.

It is, therefore, a primary object of the present invention to provide a new and useful charging system for a vehicle battery, which exhibits a superior rising characteristic at the initial operation of the alternator, without employing a bulky resistor for supplying the field coil of the alternator with an initial exciting current from the vehicle battery.

Another object of the present invention is to provide such a charging system having a simple construction.

A further object of the present invention is to provide such a charging system which can be manufactured by slightly changing the design of the conventional charging system.

A still further object of the present invention is to provide a charging system which correctly indicates whether the battery is in charging state or not by accurately detecting the generated voltage.

In accordance with the present invention, a voltage detecting means including at least one element, the impedance of which varies in accordance with the voltage applied thereto, is employed to detect the voltage at the output terminal of an auxiliary rectifier connected to the armature coils of the alternator. The voltage detecting means shows a high impedance when the voltage from the auxiliary rectifier is below a given voltage, and thus the entire current from the auxiliary rectifier is fed to the field coil of the alternator to expedite power generation at the initial period. When the voltage from the auxiliary rectifier exceeds the given voltage, the impedance of the voltage detecting means lowers to allow a current from the auxiliary rectifier to flow therethrough. A switching means such as a relay or a semiconductor switch is responsive to the impedance of the element so that the switching means drives a charge-indicating means, such as a lamp.

BRIEF DESCRIPTION OF THE INVENTION

These and other objects and features of the present invention will be more readily apparent from the following detailed description of the preferred embodiments taken in conjunction with the accompanying drawings in which.

Figure 1:
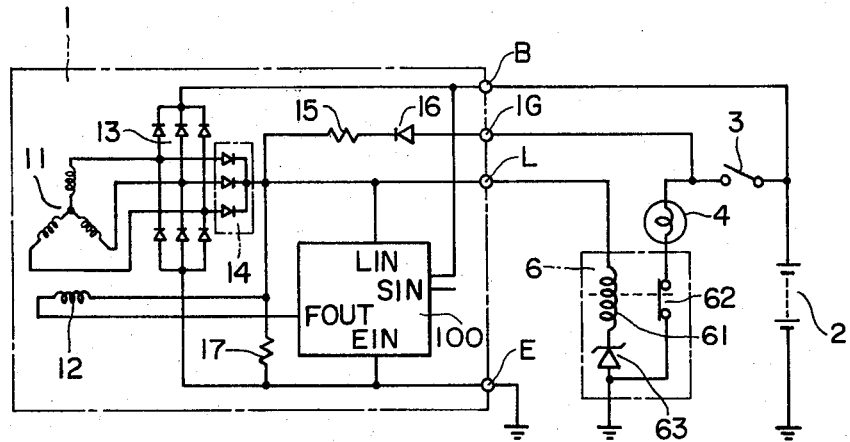
FIG. 1 is a schematic circuit diagram of an embodiment of the charging system according to the present invention.

FIGS. 3 to 9 respectively show modifications of the arrangement of FIG. 1, which modifications constitute various embodiments of the present invention.

DETAILED DESCRIPTION OF THE PREFERRED EMBODIMENTS

Reference is now made to FIG. 1, which shows a schematic circuit diagram of an embodiment of the charging system for a vehicle battery according to the present invention. The charging system comprises an alternator assembly 1 which is similar in construction to the conventional apparatus. In detail, the alternator assembly 1 comprises an alternator (no numeral) having a stator and a rotor respectively having a three-phase generating coil 11 and a field coil 12. The rotor is arranged to be driven by the engine crankshaft (not shown) so that alternating currents are induced across the generating coil 11 as the engine operates. The alternator assembly 1 further comprises main and auxiliary rectifiers 13 and 14 respectively connected to the generating coil 11. The main rectifier 13 consists of six diodes, while the auxiliary rectifier 14 consists of three diodes. One end of the main rectifier 13 is connected via a terminal E to ground, while the other end of the same is connected via a terminal B to a positive terminal of a battery 2 whose negative terminal is connected to ground. A series circuit of a field resistor 15 and a diode 16, and a voltage regulator 100 are also included in the alternator assembly 1. The series circuit is interposed between the output terminal of the auxiliary rectifier 14 and a terminal IG which is connected to a contact of a switch 3, the other contact of which is connected to the positive terminal of the battery 2. The output terminal of the auxiliary rectifier 14 is further connected to one end of the field coil 12, the other end of which is connected to a terminal FOUT of the voltage regulator 100. The output terminal of the auxiliary rectifier 14 is further connected to a terminal L, and to a terminal LIN of the voltage regulator 100, and via a resistor 17 and a terminal E to ground. The voltage regulator 100 has another terminals SIN and EIN respectively connected to the terminals B and E. The voltage regulator is of well known type, and the structure will be described below with reference to FIG. 2.

The terminal L is connected to one end of a winding 61 of a relay 6 the other end of which is connected via a Zener diode 63 to ground. The relay 6 has a movable contact arranged to bridge two stationary contacts 62, one of which is connected via a charge-indicating lamp 4 to the terminal IG, and the other is connected to ground. The Zener diode 63 is connected in series with the winding 61 in such a direction that it receives an inverse voltage from the output terminal of the auxiliary rectifier 14. The above-mentioned field resistor 15 is employed for limiting the current applied to the field coil 12, which current is used for exciting the field coil 12 at the initial period of the operation of the alternator. The diode 16 is connected in series with the resistor 15 in such a direction that a current flows only from the battery 2. Namely, the diode 16 blocks an inverse current from the output terminal of the auxiliary rectifier 14. The resistor 17 is employed for detecting the burn out of the field coil 12 circuit.

Figure 2:
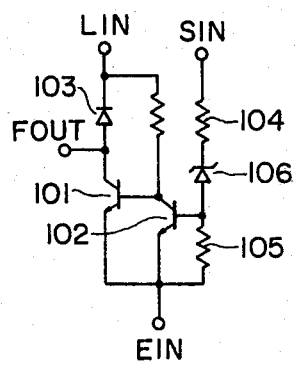
FIG. 2 is a schematic circuit diagram of the voltage regulator of FIG. 1.

Referring to FIG. 2, which shows a circuit diagram of the voltage regulator 100, the terminal FOUT is connected to a collector of a first transistor 101 the emitter of which is connected to the terminal EIN. The terminal FOUT is further connected via a diode 103 to the terminal LIN which is connected in turn via a resistor to the base of the transistor 101 and to a collector of a second transistor 102. A series circuit of a resistor 104 and a Zener diode 106 is interposed between the terminal SIN and the base of the second transistor 102. The base of the second transistor 102 is connected via a resistor 105 to the terminal EIN which is in turn connected to the emitter of the second transistor 102. The above-described structure of the voltage regulator 100 is an example, and therefore, other voltage regulator having different structure may be employed. Since the operation of the above-mentioned voltage regulator is well known, the description thereof is omitted.

The charging system of FIG. 1 operates as follows: when the switch 3 is kept open, no current is applied from the battery 2 to the field coil 12. As described in the above, the switch 3 is responsive to the ignition key of the vehicle, and therefore, the engine is not operating before the switch 3 is closed. Namely, the rotor of the alternator remains stationary at this time. It is assumed now that the ignition key is manipulated to close the switch 3. A current from the battery 2 starts flowing via the switch 3, the terminal IG, the series circuit of the diode 16 and the field resistor 15 into the field coil 12, and thus the field coil 12 is excited. Simultaneously, another current flows from the battery 2 via the switch 3 into the charge-indicating lamp 4 because the normally-closed contacts 62 remain closed. In detail, the voltage at the terminal L, i.e. the voltage at the output terminal of the auxiliary rectifier 14, is defined by a dividing ratio between the resistance of the resistor 15 and a combined resistance of the resistance of the resistor 17 and the internal resistance of the field coil 12. Since the internal resistance of the field coil 12 is much smaller than the resistance of the resistor 15, for instance, the internal resistance is 19 ohms, and the resistance of the field resistor 15 is 150 ohms, a very low voltage, such as 1 or 2 volts assuming that the voltage of the battery is 12 volts, appears at the terminal L. The zener or break down voltage of the Zener diode 63, on the other hand, is selected to be much higher than such a low voltage. For instance, the Zener voltage is set to 13 volts. Therefore, the Zener diode 63 remains unconductive exhibiting a high impedance. Accordingly, no current flows from the terminal L to the winding 61 of the relay 6. In addition, the Zener voltage of the Zener diode 63 is selected to be equal to or greater than a minimum operating voltage of the relay 6. Preferably, the zener voltage is selected to be greater than the minimum operating voltage so that variation in minimum operating voltages throughout a number of relays can be neglected. Accordingly, there is no need, in manufacturing, to select relays having a desired minimum operating voltage, which is within a give range, from a number of relays if a relay, whose rated minimum voltage is much smaller than the Zener voltage, is used.

Let it be supposed that the ignition key is further manipulated to start the engine. The engine starts running to cause the rotor of the alternator to turn. Thus, power generating is performed developing alternating currents across the generating coil 11. The alternating currents generated are rectified by the main and auxiliary rectifiers 13 and 14. As a result, a D.C. voltage is developed at the terminal L, and the voltage rises as the rotational speed of the engine crankshaft increases. When the voltage at the terminal L exceeds a predetermined voltage defined by the above-mentioned Zener voltage of the Zener diode 63, the zener diode 63 becomes conductive exhibiting a low impedance. Conduction of the Zener diode 63 causes a current from the terminal L to flow through the relay winding 61 to energize the same. Thus the movable contact of the normally-closed contacts 62 is attracted by the magnetic force generated by the winding 61 to open the contacts 62. The charge-indicating lamp 4 is thus deenergized. At this time a sufficient charging voltage is developed at the terminal B so that the battery 2 is charged by the current from the main rectifier 13.

When the engine speed drops to cause the voltage at the terminal L to be below the predetermined voltage, the zener diode 63 again becomes nonconductive to block the current flowing through the relay winding 61. Accordingly, the charge-indicating lamp 4 is reenergized to emit light.

From the foregoing description, it will be understood that no current flows through the relay winding 61 during an initial period of operation of the alternator although the voltage at the terminal L starts rising. In other words, at the very beginning of the operation the current from the battery 2 through the series circuit of the diode 16 and the resistor 15 and the other current from the auxiliary rectifier 14 are all supplied to the field coil 12 without flowing into the relay winding 61. Consequently, the rising characteristic of the alternator is not deteriorated. Namely, the alternator is capable of generating a high voltage within a short period of time from the start of the operation. Therefore, the battery 2 is effectively charged.

In case of occurrence of burn-out or disconnection of the field coil 12 of the rotor, the alternator generates no output, and therefore, the voltage at the terminal L drops to a voltage which is defined by the voltage of the battery 2 and the dividing ratio between the resistances of the resistors 15 and 17. The resistance of the resistor 17 is selected so that the voltage at the terminal L is lower than the predetermined voltage above which the relay winding 61 is energized, in case of burn-out of the field coil 12. For instance, the resistance of the resistor 17 is 100 ohms, while the resistance of the resistor 15 is 150 ohms as mentioned hereinbefore. Therefore, the voltage at the terminal L is 4.8 volts when the voltage of the battery 2 is 12 volts. If the Zener voltage is above the voltage at the terminal L, the Zener diode 63 becomes nonconductive causing the charge-indicating lamp 4 to emit light. Therefore, the vehicle driver can notice the abnormal condition of the charging system because the charge-indicating lamp 4 emits light even though the engine runs at a high speed. If the engine is restarted, after stopping the same once, the charge-indicating lamp 4 again keeps emitting light because the voltage at the terminal L does not exeed the predetermined voltage.

In the above-described embodiment of the present invention, although the single zener diode 63 is used to detect the voltage at the terminal L, various modifications can be made as follows: FIGS. 3 to 9 respectively show different embodiments of the charging system according to the present invention. FIGS. 3 to 9 shows charging systems partially because the remaining circuit arrangement in these embodiments is the same as that of FIG. 1. The same elements are designated at like numerals throughout the drawings.

Figure 3:
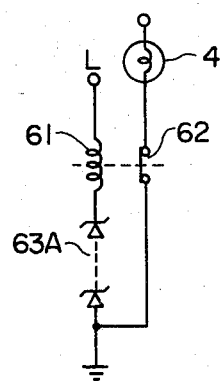

The embodiment of FIG. 3 is the same in construction as that of FIG. 1 except that the single Zener diode 63 of FIG. 1 is replaced by a plurality of Zener diodes 63A connected in series. By using more than one Zener diode, the rated Zener voltage of each diode can be reduced compared to the case of using a single Zener diode. The Zener voltage of the series circuit of the Zener diodes 63A corresponds to the sum of the respective Zener voltages.

Figure 4:
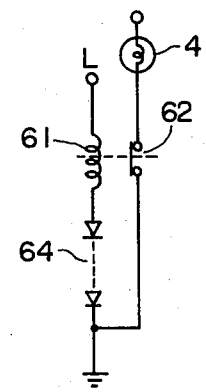

The embodiment of FIG. 4 differs from the previous embodiments in that a plurality of diodes 64 are used in place of one or more than one Zener diode, and in that the diodes 64 are arranged in the forward direction. With this arrangement, a forward voltage drop appears across each of the diodes connected in series. Therefore, when the voltage at the terminal L exceeds a predetermined voltage which corresponds to the sum of respective forward voltage drops of the diodes 64, a current flows through the relay winding 61.

Figure 5:
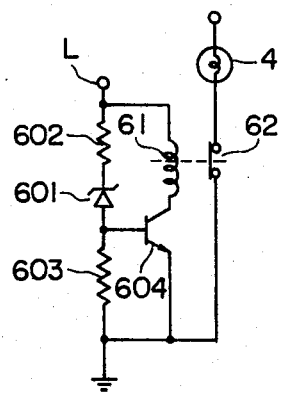
Figure 6:
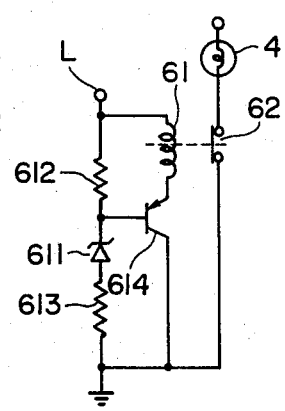
Figure 7:
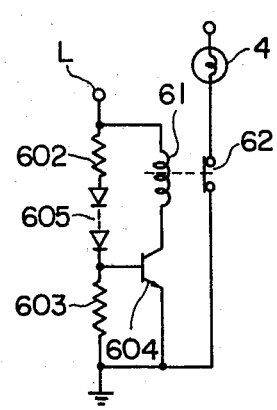

In the embodiments of FIGS. 5 to 7, the voltage at the terminal L is detected by a circuit having a transistor and a Zener diode or a plurality of diodes. Namely, in the embodiment of FIG. 5, the terminal L is connected via the relay winding 61 to a collector of a transistor 604, whose emitter is grounded. A series circuit of a resistor 602 and a Zener diode 601 is interposed between the terminal L and the base of the transistor 604. The base of the transistor 604 is grounded via a resistor 603. The circuit of FIG. 5 operates in such a manner that a base current flows into the base of the transistor 604 to render the same conductive when the voltage at the terminal L exceeds the Zener voltage of the Zener diode 601. Namely, in receipt of a voltage higher than the Zener voltage at the terminal L, the Zener diode 601 becomes conductive, and thus the voltage at the base of the transistor 604 is defined by the dividing ratio between the resistances of the resistors 602 and 603. The embodiment of FIG. 6 is a modification of the arrangement of FIG. 5. Namely, a resistor 612 is interposed between the terminal L and a base of a transistor 614, the emitter of which is connected to the relay winding 61, and a series circuit of a Zener diode 611 and a resistor 613 is interposed between the base and collector of the transistor 614, which collector is grounded. Circuit of FIG. 6 operates in the same way as that of FIG. 5, and thus the collector emitter path of the transistor 614 becomes conductive when the voltage at the terminal L exceeds a predetermined voltage causing a current to flow through the relay winding 61.

The embodiment of FIG. 7 is also a modification of the circuit of FIG. 5. Namely, the single zener diode 61 of FIG. 5 is substituted with a plurality of diodes 605 which are arranged in the forward direction.

Although in the above-described embodiments, a current flowing through the relay winding 61 is fed from the terminal L, namely, from the output terminal of the auxiliary rectifier 14 of FIG. 1, the current may be supplied from the battery 2 via the switch 3. The embodiment of FIG. 8 differs from the arrangement of FIG. 5, in that the relay winding 61 is interposed between the switch 3 and the collector of the transistor 604. With this arrangement, therefore, a current flows into the relay winding 61 from the battery 2 when the transistor 604 becomes conductive.

Figure 8:
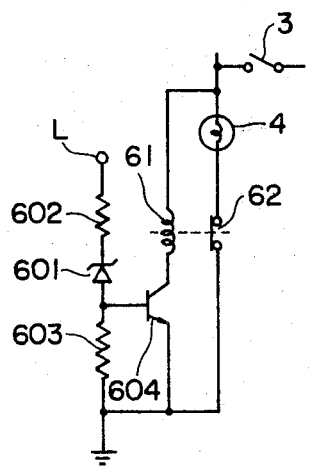
Figure 9:
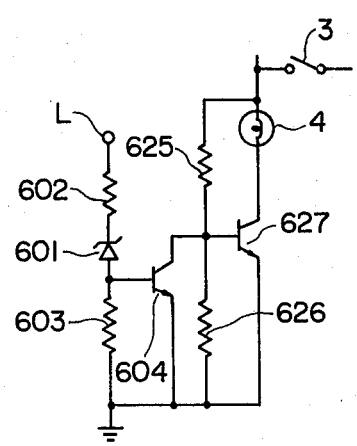

In the embodiment of FIG. 9, no relay is used, but a transistor 627 is employed to drive the charge-indicating lamp 4. In detail, the collector of the transistor 627 is connected via the lamp 4 to the switch 3, and the emitter of the same is grounded. Two resistors 625 and 626 constituting a voltage divider are respectively interposed between the switch 3 and the base of the transistor 627, and between the base of the same and ground. A circuit arrangement of resistors 602, 603, a Zener diode 621, and a transistor 604, which are connected in the same manner as in FIG. 8, is provided where the collector of the transistor 604 is connected to the base of the transistor 627. When the voltage at the terminal L is below the predetermined voltage, the transistor 604 is kept nonconductive. Therefore, the voltage at the base of the transistor 627 is defined by the voltage dividing ratio between the resistances of the resistors 625 and 626. As a result, a base current flows into the base of the transistor 627 to render the same conductive. Thus, the lamp 4 is energized to emit light. On the other hand, when the voltage at the terminal L exceeds the predetermined voltage, the transistor 604 becomes conductive because a base current flows into the base of the same through the Zener diode 601. As a result, the voltage at the base of the transistor 627 drops to substantially zero rendering the transistor 627 nonconductive. Therefore, the lamp 4 is deenergized.

In the previous embodiments, although the lamp 4 is used for indicating the charging state of the charging system, other indicating or displaying devices, such as a light-emitting diode or the like, may be used therefor. Furthermore, the charge-indicating device, such as the lamp 4 in the above-described embodiments, may be indirectly driven by an auxiliary switch, such as a relay, without driving the same by the switch 3 included in or controlled by the ignition key switch.

What is claimed is:

1. A charging system for a vehicle battery, comprising:
   an alternator assembly having an alternator, main and auxiliary rectifiers and a voltage regulator, said alternator having a field coil and a three-phase generating coil, said main and auxiliary rectifiers being respectively interposed between said generating coil and said battery, and between said generating coil and said field coil;
   a switch for supplying said field coil with an initial exciting current from said battery;
   a voltage detector responsive to the voltage from said auxiliary rectifier, and having at least one element whose impedance is variable in accordance with said voltage;
   means for indicating whether the voltage generated by said alternator and applied through said auxiliary rectifier is above a predetermined value or not; and
   a switching circuit having a relay with a winding and normally closed contacts, said relay being arranged such that current flowing through said winding is controlled in accordance with the variation in impedance of said element, said indicating means being connected to one of said normally closed contacts so as to be energized when said normally closed contacts are in a closed state, said relay being energized when said voltage detector detects that the voltage from said auxiliary rectifier is greater than said predetermined voltage, to open said normally closed contacts.

2. A charging system as claimed in claim 1, wherein said at least one element of said voltage detector is a semiconductor element.

3. A charging system as claimed in claim 2, wherein said semiconductor element is a Zener diode.

4. A charging system as claimed in claim 1, wherein said at least one element of said voltage detector comprises a plurality of semiconductor diodes connected in series in the forward direction.

5. A charging system as claimed in claim 1, wherein said at least one element of said voltage detector comprises a Zener diode connected in series with said winding of said relay, a series circuit of said relay winding and said Zener diode being interposed between the output terminal of said auxiliary rectifier and ground.

6. A charging system as claimed in claim 1, wherein said at least one element of said voltage detector comprises a plurality of Zener diodes connected in series with said winding of said relay in the reverse direction, a series circuit of said relay winding and said plurality of Zener diodes being interposed between the output terminal of said auxiliary rectifier and ground.

7. A charging system as claimed in claim 1, wherein said at least one element of said voltage detector comprises a plurality of diodes connected in series with said winding of said relay in the forward direction, a series circuit of said relay winding and said plurality of diodes being interposed between the output terminal of said auxiliary rectifier and ground.

8. A charging system as claimed in claim 1, wherein said switching circuit further comprises a semiconductor switch connected in series with said winding of said relay.

9. A charging system as claimed in claim 8, wherein said semiconductor switch comprises a transistor, the collector-emitter path of which is connected in series with said winding of said relay.

10. A charging system as claimed in claim 9, wherein said voltage detector comprises a series circuit of a resistor and a Zener diode, interposed between the output terminal of said auxiliary rectifier and the base of said transistor, and a resistor interposed between said base and the emitter of said transistor, which emitter is grounded.

11. A charging system as claimed in claim 10, wherein said voltage detector comprises a resistor interposed between the output terminal of said auxiliary rectifier and the base of said transistor, and a series circuit of a resistor and a zener diode, interposed between said base and the collector of said transistor, which collector is grounded.

12. A charging system as claimed in claim 10, wherein said voltage detector comprises a series circuit of a resistor and a plurality of series diodes, interposed between the output terminal of said auxiliary rectifier and the base of said transistor in the forward direction, and a resistor interposed between said base and the emitter of said transistor, which emitter is grounded.

13. A charging system as claimed in claim 1, wherein said winding of said relay is arranged to receive an energizing current from the output terminal of said auxiliary rectifier.

14. A charging system as claimed in claim 1, wherein said winding of said relay is arranged to receive an energizing current from said switch.

15. A charging system as claimed in claim 1, wherein said means for indicating comprises a lamp interposed between said switch and one of said normally-closed contacts of said relay.

* * * * *